June 20, 1944. C. W. WOOD Re. 22,502

ROAD MATERIAL MIXING MACHINE

Original Filed July 3, 1933 4 Sheets-Sheet 1

INVENTOR.
Clyde W. Wood.

BY

Townsend & Loftus.
ATTORNEYS.

June 20, 1944. C. W. WOOD Re. 22,502
ROAD MATERIAL MIXING MACHINE
Original Filed July 3, 1933 4 Sheets-Sheet 2
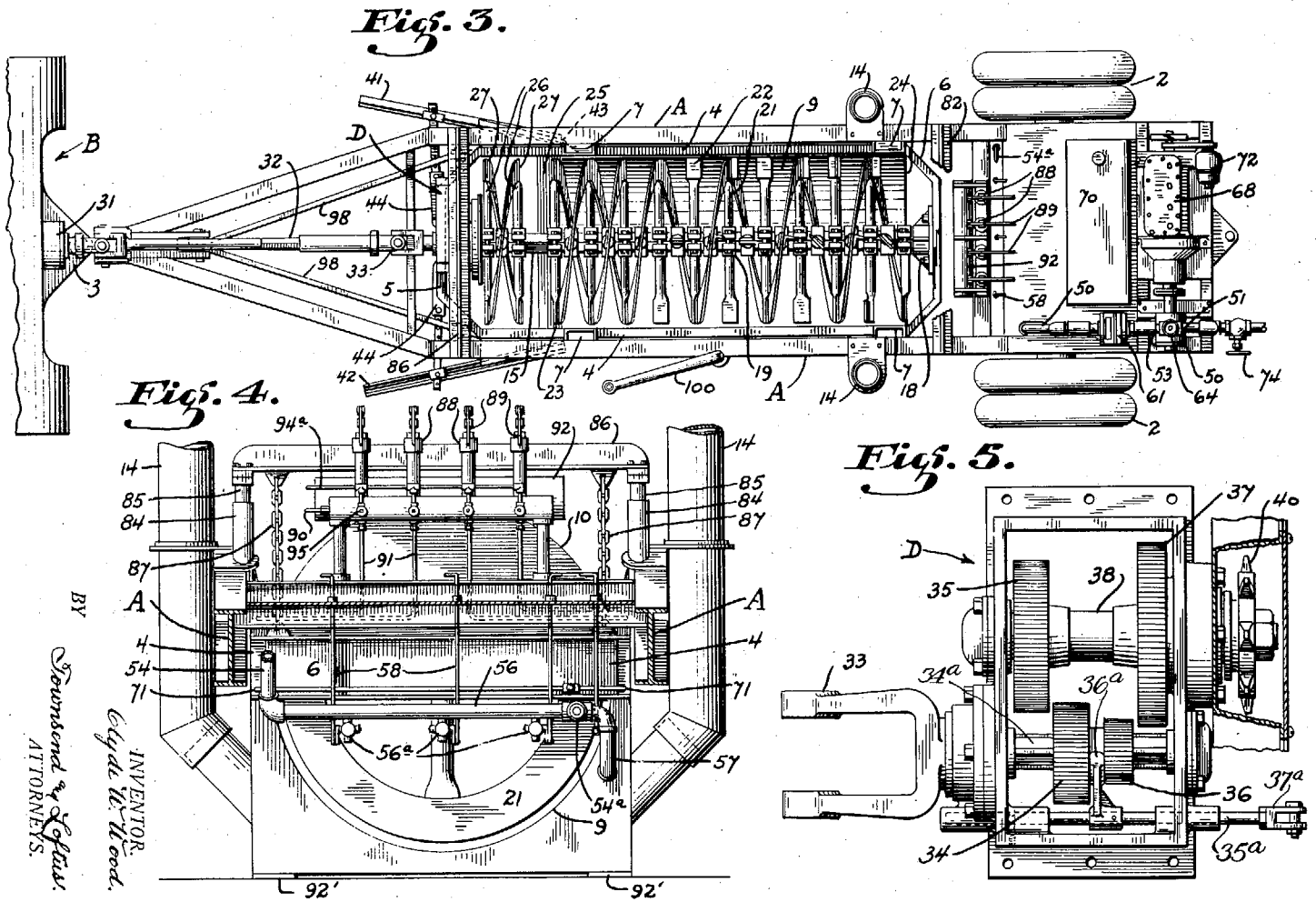
INVENTOR.
Clyde W. Wood.
BY
Townsend and Loftus.
ATTORNEYS.

June 20, 1944. C. W. WOOD Re. 22,502

ROAD MATERIAL MIXING MACHINE

Original Filed July 3, 1933 4 Sheets-Sheet 3

INVENTOR.
Clyde W. Wood.

BY Townsend & Loftus.
ATTORNEYS.

June 20, 1944. C. W. WOOD Re. 22,502

ROAD MATERIAL MIXING MACHINE

Original Filed July 3, 1933 4 Sheets-Sheet 4

INVENTOR.
Clyde W. Wood.
BY
Townsend and Loftus.
ATTORNEYS.

Reissued June 20, 1944

Re. 22,502

UNITED STATES PATENT OFFICE 22,502

ROAD MATERIAL MIXING MACHINE

Clyde W. Wood, Pasadena, Calif.

Original No. 1,997,959, dated April 16, 1935, Serial No. 678,913, July 3, 1933. Application for reissue August 24, 1943, Serial No. 499,851

21 Claims. (Cl. 94—42)

This invention relates to a road material mixing machine; the invention forming a continuation in part of my copending applications entitled "Mixing machine for road material" filed May 27, 1932, Serial Number 613,887, and "Road material mixing machine" filed December 2, 1932, Serial Number 645,387.

The object of the present invention is to generally improve and simplify the construction and operation of machines of the character described; to provide a road material mixing machine wherein dirt, sand, gravel, or other material forming the surface or shoulders of a road, or the like, may be thoroughly mixed with oil or any suitable binder for the formation of a road surface, and more particularly, to provide a machine adapted to travel over the road, or surface to be treated, and which is capable of gathering up the material while traveling over the surface and then thoroughly mixing the material with a binder and finally redepositing the material in a condition to be leveled off and rolled or otherwise compacted to form a finished road surface.

The road material mixing machine is shown by way of illustration in the accompanying drawings, in which—

Fig. 3 is a plan view of the machine showing the cylinder cover removed.

Fig. 4 is a vertical cross section taken on line IV—IV of Fig. 1.

Fig. 5 is a plan view of the auxiliary transmission supported on the vertically adjustable frame.

Figure 1:
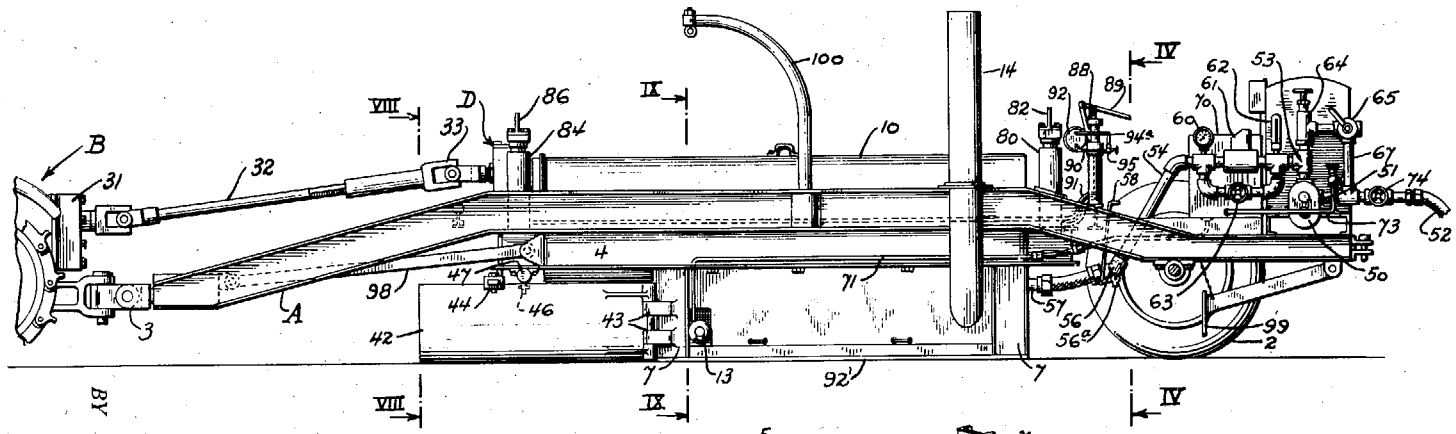
Fig. 1 is a side elevation of the machine.
Figure 2:
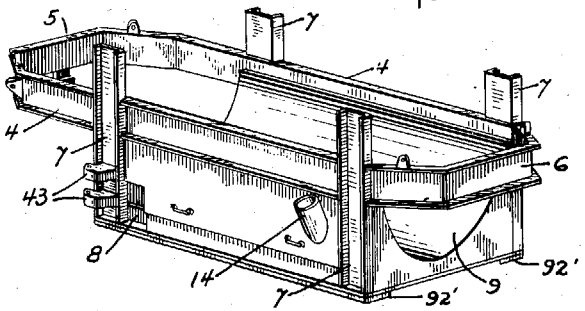
Fig. 2 is a perspective view of the vertically adjustable frame.
Figures 7, 8, 9:
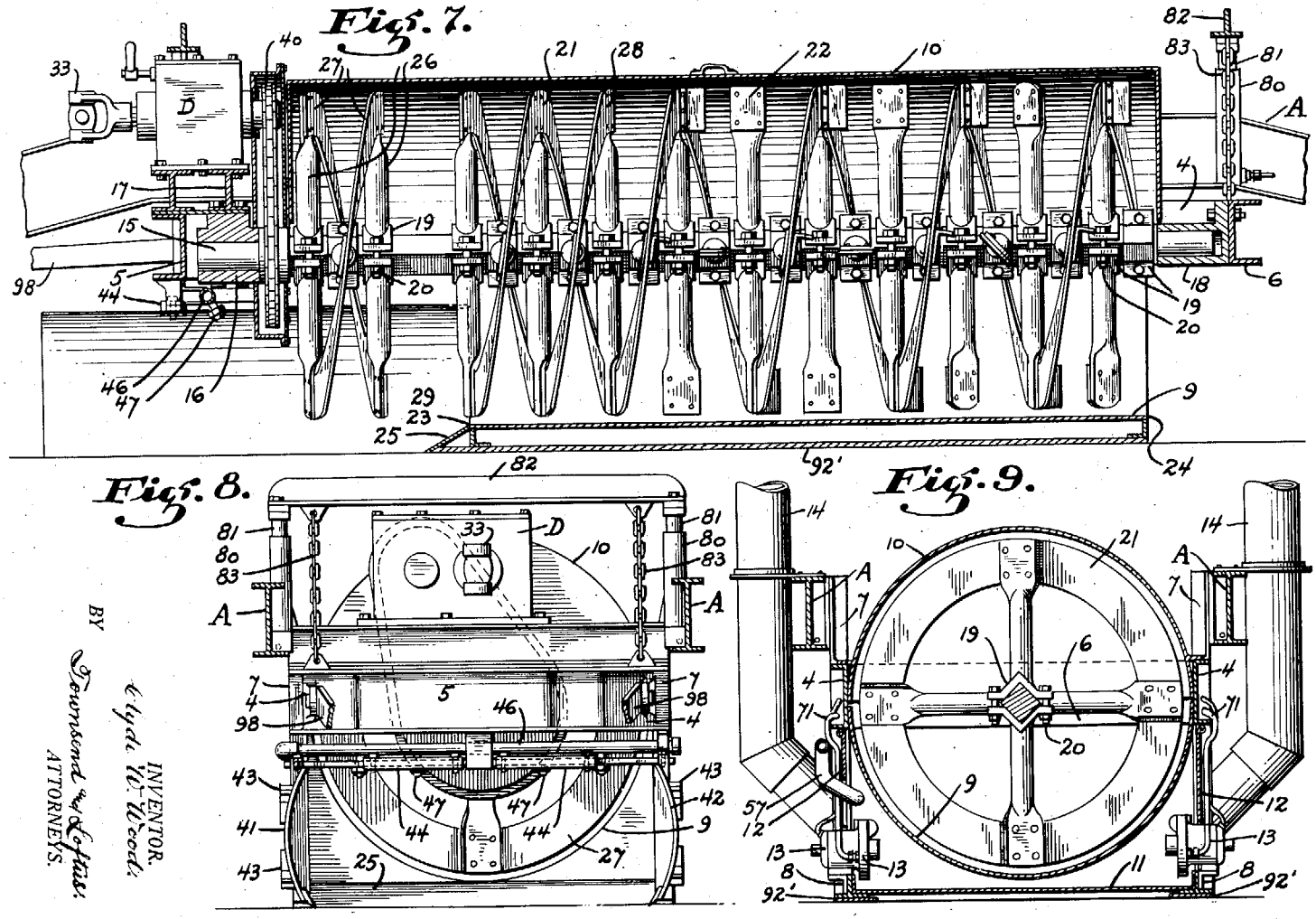
Fig. 7 is an enlarged central vertical longitudinal section of the mixing cylinder, said view also showing the rotatable conveyor and mixer mounted within the cylinder and the manner in which it is driven.
Fig. 8 is a vertical cross section taken on line VIII—VIII of Fig. 1.
Fig. 9 is a vertical cross section taken on line IX—IX of Fig. 1.

Referring to the drawings in detail, and particularly Figs. 1 and 3, A indicates the side bars of a main frame supported at its rear end by a cross axle and a pair of wheels 2, and at the forward end by drawbar coupling 3 which is attached to a tractor B of any suitable type. Suspended between the side bars of the main frame in a manner hereinafter to be described is a vertically adjustable frame. This frame is best shown in Figs. 2 and 9, and as noted, consists of a pair of horizontally disposed longitudinally extending channel bars 4 connected at opposite ends by cross bars 5 and 6. Welded, or otherwise secured, to the bars 4 are pairs of vertically disposed channel bars 7, and secured to the lower ends of the bars 7 are a pair of horizontally disposed I-beams 8, there being one on each side of the frame.

The vertically adjustable frame forms a support for a mixing cylinder; a rotatable conveyor and mixer which extends therethrough; a housing forming a furnace for the reception of one or more oil burners whereby the mixing cylinder is heated and it furthermore carries a pair of ground engaging runners, the function of which will hereinafter be described.

The mixing cylinder extends substantially from end to end of the vertically adjustable frame, see Figs. 1, 3 and 7, and consists of two sections a lower half section 9 which is permanently secured between the channel bars 4—4 of the vertically adjustable frame and an upper half section 10 which is removable and functions as a cover to permit access to the cylinder for cleaning, inspection, repair, etc.

The furnace is disposed below the lower half section of the cylinder and consists of a bottom plate 11, see Figs. 1 and 9, which is welded or otherwise secured to the I-beams 8. This plate extends from the forward intake end of the cylinder to the rear end, and side plates 12—12 are also provided and extend the same distance. These plates, together with end plates and the bottom plate 11, form a chamber below the lower half of the cylinder and a pair of oil burners, such as indicated at 13, are positioned at opposite sides of the chamber and near the forward end. The flames from these burners are directed rearwardly along opposite sides of the lower half of the mixing cylinder and finally escape through a pair of stack members 14—14 which are disposed one on each side of the furnace chamber.

The material conveying and mixing mechanism is best illustrated in Figs. 7 and 9. It consists of a shaft 15 which extends from end to end of the mixing cylinder. This shaft is journaled at its forward end in a bearing 16 which is secured to the lower side of a cross beam 17. The rear end of the shaft is journaled in a bearing 18 and this bearing is secured to the inner face of the cross bar or beam 6. The shaft intermediate the bearings 16 and 18 is preferably square in cross section and a plurality of tubular arms are secured to the shaft throughout its length as shown. These arms are welded to V-shaped clamps generally indicated at 19, one arm to each clamp. These clamps and arms are placed in opposition to each other on the shaft and are there secured by bolts and the like indicated at 20. The outer ends of the arms function as a support for a helical-shaped conveyor band 21 which is riveted, welded, or otherwise secured. The outer ends of the arms also form supports for a series of paddles or blades generally indicated at 22, which serve two functions, first that of assisting the mixing of the material and secondly that of partially retarding or throwing back the material against the action of the helical feeder 21 so that a more thorough mixing action will be obtained.

By referring to Fig. 7 in particular, it will be noted that the lower half of the mixing cylinder extends from the point 23 to the rear or discharge end indicated at 24 and that the upper half or cover section extends a considerable distance forwardly of the forward end of the lower half of the cylinder. This is an important feature as a space is thereby provided whereby a feeding mechanism may be introduced to assist delivery of the road material into the mixer. When the machine is in operation a scraper blade 23, which is secured to the forward end of the lower half of the mixing cylinder, extends into the ground anywhere from four to six inches below the surface to be treated. When the machine is moving forwardly over the surface, the dirt or material tends to build up to a considerable extent in front of the scraper blade and as such would impose a considerable drag or load on the tractor hauling the machine. Such building up of the material in front of the blade 23 is however avoided by the application to the shaft 15 of the arms indicated at 26. These arms carry a pair of helical conveyor bands 27 and as the material gathers in front of the scraper blade 23 it is engaged by the helical conveyor and thrown rearwardly into the front end of the lower half of the mixing cylinder. A section of a helical conveyor, such as shown at 28, is employed at the forward end of the conveyor 21. This assists in removing the material delivered by the scraper blade and by the conveyor 27. In other words it tends to maintain the space immediately rearwardly of the blade clear and thereby forces the material rearwardly where it is acted upon by the mixing paddles and finally discharged at the rear end. It should also be noted that a space 29 is formed between the conveyors 27 and 21. This is of considerable importance as it often happens that material is encountered which contains fairly large rocks or boulders. If the conveyor band was continuous from the extreme forward end to the rear end there would be a tendency to jam the rocks between the scraper blade and the conveyor band and thus cause bending and breakage but by providing an interruption in the band, or the space indicated at 29, such danger is entirely avoided.

The material to be mixed may be gathered from a comparatively wide area or strip or from a narrow strip. For instance, if an entire road surface is to be treated the machine will travel at a comparatively low speed, namely, a quarter of a mile an hour, as a comparatively wide strip of material will be gathered and passed through the mixing cylinder. On the other hand if the side shoulders of a paved highway are to be treated, a comparatively narrow strip of material will be passed through the mixer and it is then possible to operate at a speed, say for instance, a half mile an hour, as less material will be handled. In actual practice it has been found that the revolutions per minute of the conveyor and mixing blades should not be much in excess of seventy-five revolutions per minute, as any speed beyond that tends to throw the material outwardly by centrifugal action. Plainly speaking, the revolutions must be kept down to a point where the material is not passed through the mixer too rapidly so that a thorough mixing action may be obtained without throwing the material centrifugally, and inasmuch as the machine is intended to travel at different speeds means must be provided for maintaining the revolutions of the mixer at a constant speed regardless of the speed with which the machine proper is driven. For this purpose an auxiliary transmission is provided which is generally indicated at D, see Fig. 7.

This transmission is best shown in Fig. 5. Power from the tractor is utilized. The power is taken from the power take-off shaft generally indicated at 31 at the rear end of the tractor. It is then transmitted through a splined and telescoping shaft 32, which is connected with the transmission D, through a universal coupling 33. If the tractor is traveling at a slow speed, for instance a quarter of a mile an hour, when handling a wide strip of material the power from shaft 32 is transmitted through the gears indicated at 34 and 35, but when the tractor is driven at a half mile speed the power will be transmitted through the gears 36 and 37; the power from shaft 38 being finally transmitted to the shaft 15 through a reduction sprocket chain drive generally indicated at 40. The shifting of the gears is accomplished by conventional means, the gears 34 and 36 being slidable on a splined shaft 34*a* so that they may be brought into mesh with the gears 35 and 37, respectively. A sliding shifting bar 35*a* carries an arm 36*a* which fits a groove between the gears and moves them in either direction upon sliding of the shifting bar which is fitted with a clevis 37*a* at its outer end for connection with any suitable operating lever, not shown. Hence, regardless of whether the tractor is operating at its high or low speed, a substantially constant speed of rotation may be maintained within the mixer, this being essential as previously described to prevent centrifugal throwing of the material, and it is also essential as it has been found that the best action is obtained if a constant amount of material is maintained in the mixer at all times. In other words if the machine is operating at slow speed and handling a certain strip of material there will be a predetermined amount of material continuously passing through the mixer. Again, if the machine is traveling at half mile speed and handling a narrow strip of material substantially the same amount of material will pass through the machine as the speed of the tractor is doubled. Another advantage of maintaining such a condition is that it substantially eliminates any adjustment of the spray nozzles whereby oil or other binder is delivered. That is, if the amount of material passing through is constant at all times the amount of oil or other binder delivered may be constant. On the other hand if the amount of material varied in proportion to the speed at which the machine was traveling over the surface to be treated, changes in adjustments would be required.

Figure 6:
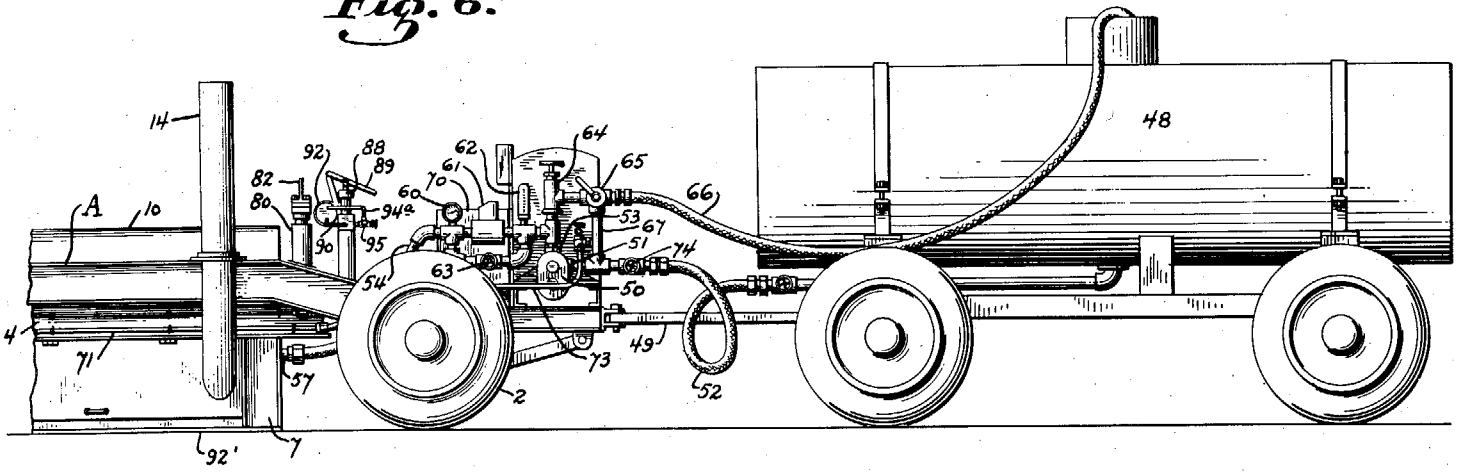
Fig. 6 is a side elevation showing the rear end of the road material mixing machine, said view also showing the manner in which a truck or trailer supplying oil or other binding material is attached to the machine.

In order that the amount of material passing through the mixing cylinder may be regulated, a pair of gathering blades are placed at the forward end of the machine. These blades are indicated at 41 and 42. They are hingedly secured at their inner ends, as indicated at 43, to the forward end of the vertically adjustable frame. These hinges are furthermore disposed at opposite ends of the transversely disposed scraper blade 25, and if the blades assume the position shown in Fig. 3, material from a comparatively wide area will be gathered inwardly and will thus be delivered to the front end of the mixing cylinder. The forward ends of the blades are connected by means of arms, such as shown at 44, see Fig. 3, and each arm is independently adjustable so that one or both blades may be swung inwardly or outwardly as conditions may demand. The binder employed may be crude oil or a similar material. It is applied to the material to be mixed at a point forwardly of the scraper blade 23. A pipe 46 extends transversely of the vertically adjustable frame adjacent the forward end thereof. This pipe is provided with a plurality of nozzles 47 and they direct the oil or other binder employed in the form of a spray directly onto the material to be gathered up and mixed. The quantity of oil or other binder thus employed will, of course, be comparatively large and means must be provided for maintaining a continuous supply. This is accomplished as shown in Figs. 1 and 6 by employing a tank wagon trailer such as shown at 48. This is connected to the rear end of the road material mixing machine by a drawbar 29 and flexible pipe connections may be made between the tank and a pump generally indicated at 50. This pump has an inlet connection 51 which is connected with the bottom of the tank 48 through a flexible pipe connection 52. The discharge of the pump is indicated at 53 and this is connected through a pipe 54 with one end of a transverse pipe 56, see Fig. 4. The opposite end of this transverse pipe is connected to a pipe 57 and this extends forwardly and is connected with one end of the transverse pipe 46 on which the spray nozzles 47 are mounted. Any suitable valve is provided for opening or closing the flow through the pipe connections described so as to shut off the flow and also to regulate the flow.

By again referring to Fig. 4, it will be noted that the transverse pipe 56 is provided with a plurality of spray nozzles **56*a* and that these are valve controlled, each valve having an extension rod 58 which is adapted to be pulled or lifted so as to open one or more of the spray nozzles 56*a***. These nozzles are disposed at a point rearwardly of the discharge end of the mixing cylinder and they are only utilized if it is found that an additional quantity of oil or binder is required.

By referring to Figs. 1 and 6 it will be noted that the supply pipe 54 is provided with a gauge 60 which indicates the pressure on the oil. It is also provided with a meter 61 and a thermometer 62. By these means temperature, pressure and the exact quantity of oil employed may be determined. A by-pass connection 63 is formed around the meter and this is valve controlled so that oil may be by-passed around the meter if desired. An automatic relief valve is positioned at the point 64 and this is connected with a valve 65, this valve being in turn connected through a flexible hose 66 with the tank and with a by-pass pipe 67, which connects with the suction side of the pump. When the road material mixing machine is in operation, power is delivered to operate the pump 50 from an engine generally indicated at 68, see Fig. 3. With the pump in operation oil will be drawn from the bottom of the tank and will pass through the pipe 54 forwardly to the spray nozzles indicated at 47, and if additional oil is required one or more of the nozzles indicated at **56*a* may be opened. The capacity of the pump will normally be a little larger than the quantity of oil actually delivered to the nozzles and it is for this reason that an automatic relief valve is employed. That is, the moment the pressure on the oil reaches a predetermined pressure valve 64 opens and the oil thus passes through the valve 65 and the by-pass connection 67 back to the intake of the pump. The valve 65 is a three-way valve and, if desired, it may be so adjusted that the excess oil may be returned through the hose 66 back to the tank. If it is desired to throw the meter out of operation it is only necessary to open the valve controlled by-pass 63**.

By referring to Figs. 1, 3 and 6, it will be noted that a comparatively large fuel tank is placed on the rear end of the road material mixing machine as indicated at 70. This tank may contain a fuel oil, such as distillate, or the like, and it is primarily intended to supply fuel to the oil burners indicated at 13, see Figs. 1 and 9. A pair of pipes such as shown at 71 are connected with the respective burners and with the bottom of the tank 70. These pipes are valve controlled and the size of the flame may thus be controlled. The burners are of the centrifugal atomizing type and are electric motor driven. Current is supplied to each motor through proper wire connections and the current is obtained from a generator 72 driven by the engine 68, see Fig. 3. The distillate is not only employed for the purpose of supplying the burners but it is also employed for cleaning out the pump, the meter, the spray nozzles and the several pipe connections when a run is completed. That is, the type of binder or oil employed is usually a comparatively heavy grade of oil and flows readily when maintained at the proper temperature. It has a tendency to harden and clog when cool, hence it is advisable when shutting down to clean out the several connections so as to have clear passage when the machine is again to be placed in operation.

To accomplish this a pipe 73 is connected at one end with the fuel tank 70 and at the opposite end with the intake of the pump, see Fig. 1. By shutting the valve 74 on the inlet pipe and by placing the pump 50 in operation distillate will be sucked into the intake of the pump through the pipe 73. By closing the valves 63 and **54*a* oil may first be circulated through the relief valve 64, by-pass valve 65 and the by-pass connection 67, and when this is cleaned out the valve 65 may be adjusted to direct the oil into the hose 67 and discharge it into the tank 48. By opening the valve 54*a* distillate may be directed through the meter and the pipes connected with the front and rear set of spray nozzles. These pipe connections and the spray nozzles may thus be cleaned out, and when this is accomplished the valve on pipe 73** may be closed and the pump shut down.

It was previously stated that the mixing cylinder, the furnace cooperating therewith, and so on, were supported in a vertically adjustable frame which was suspended between the side bars A of the main frame. This method of suspension will now be described and particular reference will be made to Figs. 1, 4 and 8. By referring to these figures it will be noted that a pair of hydraulic cylinders 80 are secured to the side bars A—A on the main frame at a point adjacent the rear end. Each cylinder carries a piston 81 and these pistons are connected by a cross bar 82. This cross bar carries a pair of chains 83 and these are connected to the rear cross bar 6 of the vertically adjustable frame. A pair of cylinders 84 are secured to the side bars A—A of the main frame at a point adjacent the forward end of the same. A piston 85 is mounted in each cylinder and the pistons are connected by a cross bar 86, this cross bar also carries a pair of chains 87 and these chains are connected to the forward cross bar 5 of the vertically adjustable frame, see Fig. 8. Means are employed for actuating each individual hydraulic cylinder, hence making it possible to raise or lower any of the corners of the vertically adjustable frame or to raise and lower the frame as a whole. This is accomplished by providing a series of hand pumps, one for each cylinder. These pumps are indicated at 88, see Figs. 1 and 4. Each pump is provided with a hand lever 89 to permit it to be operated by hand and each pump is provided with an inlet pipe 90 and a discharge pipe 91, there being one discharge pipe from each pump to each hydraulic cylinder and there being one intake pipe for each hand pump, said intake pipes being all connected to a common reservoir or tank 92 which contains oil for operation of the hydraulic cylinders or jacks. Each hand pump is also provided with a return pipe 94 and a valve 95. By closing the valves 95 and operating the pump handles or levers 89 oil is pumped from the tank 97 to the respective hydraulic jacks or cylinders indicated at 80 and 84 supplying them with oil and causing the pistons to raise. If it is desired to lower any one of the hydraulic jacks, it is only necessary to open one or more of the valves 95. This permits the oil to flow back through the pumps to the supply tank 92, thus manually actuated means are provided for raising and lowering the vertically adjustable frame as a whole. Either end may be lifted or lowered, or any corner may be lifted and lowered. Vertical adjustment of the frame is essential as it controls the depth to which the scraper blade 23 enters the material to be treated. If it is desired to treat the material to a depth of approximately six inches the frame is lowered until the lower face of the blade 23 is six inches below the surface. If a greater depth is required it can be further lowered and so on. The gathering blades 41 and 42 are also supported by the adjustable frame and are raised and lowered with the scraper blade and as such will sink into the material to be treated the same depth as the scraper and they will direct the material toward the scraper blade where it will be engaged by the conveyor and thrown rearwardly into the front portion of the mixing cylinder and then fed through as previously described.

It was previously stated that a pair of ground engaging runners were employed. These runners are best illustrated in Figs. 1, 7 and 9, and are indicated at 92'. These runners extend from the scraper blade to the rear end of the mixing cylinder, there being one runner at each side and they are welded or otherwise secured to the I-beams 8. The runners are not intended to carry the weight of the adjustable frame and the mechanism carried thereby, as the weight is carried by the hydraulic jacks and the chains 83 and 87. A certain amount of weight, however, is carried by the runners but that is not their main function. It is obvious that when a large body of material is passing through the mixing cylinder and when the conveyor is rotating there will be a tendency to transmit a turning torque to the mixing cylinder and the adjustable frame. This torque is taken care of by the runners and twisting of the vertically adjustable frame is thereby relieved to a very considerable extent. The pairs of vertical channel bars 7 on the vertically adjustable frame form guide members between the side bars A—A of the main frame; that is, the vertical channel bars of the vertically adjustable frame engage the inner faces of the bars A—A and thus guide the vertically adjustable frame when it is being raised or lowered by the hydraulic jacks and they also assist in taking up part of the turning torque transmitted through the rotating mixer and conveyor when the machine is in operation. It might be said that the vertically adjustable frame and all the mechanism carried thereby floats as it is hung from the chains 83 and 87. In view thereof it is essential that the drive to the mixer be mounted on the same frame. It is for this reason that the auxiliary transmission D is supported directly on the cross beams on the forward end of the vertically adjustable frame, see Fig. 7. Hence, no adjustment or disconnection of the drive is necessary when vertical adjustment is made between the main frame and the vertically adjustable frame. The drive shaft 32 connected with the auxiliary transmission D is of a telescoping nature and universal joints are also employed hence permitting any adjustment desired between the main frame and the vertically adjustable frame and between the power take-off shaft of the tractor. In view of the fact that the vertically adjustable frame is suspended by the chains 83 and 87, it is essential to employ a radius rod connection such as indicated at 98, see Figs. 1 and 3. There are two radius rods employed and they are pivotally connected to the forward end of the frame and to opposite sides of the vertically adjustable frame, thereby permitting free vertical movement but preventing endwise movement.

In actual operation the road material mixing machine is pulled ahead by the tractor shown in Fig. 1; the vertically adjustable frame being lowered until the scraper blade 23 reaches substantially to the bottom of the loose material forming the road surface, this material having previously been loosened by road breaking machines, scarifiers, etc., and reduced to proper consistency for mixing with oil or the like. As the machine advances the loosened material is engaged by the gathering blades 41 and 42 and by these blades directed toward the scraper blade and partially elevated by the same. The material has a tendency to pile up in front of the scraper blade and as such would produce a drag and materially increase the load or pull imposed on the tractor.

To prevent piling up of the material and to insure positive feeding into the forward end of the mixing cylinder the double helical feeder, shown at 26 and 27, is employed. This feeder is disposed ahead of the scraper blade and as such engages the material and throws it rearwardly and to the front end of the mixing cylinder. The material is thus prevented from piling up in front of the machine and is furthermore positively delivered into the forward end of the cylinder. After the material has entered the cylinder positive movement of the material in a rearward direction is insured by the double arrangement of the helical conveyor indicated by the numerals 21 and 28, but once the material has started in a rearward direction the single helix, which continues to the rear end of the cylinder, is all that is required. Space must be allowed for the arms on which the mixing paddles are secured. These paddles, as previously stated, are arranged at different angles to insure an effective mixing action, the last few paddles being set on an angle to retard discharge of the material and to throw a portion of the material forwardly. This arrangement of the paddles insures a thorough mixing of the materials passing through the cylinder and, furthermore, insures a positive and continuous movement and a uniform deposition at the rear or discharge end of the cylinder.

The oil or other binder employed is discharged or sprayed on top of the loosened material through the nozzles 47, the oil being drawn from the trailer tank 48 by the pump 50 and delivered to the spray nozzles under pressure. The oil contained in the tank 48 is hot to insure thorough mixing with the material but experience has shown that there is a tendency for the oily mass to chill and adhere to the walls of the mixing cylinder, particularly as the material approaches the rear or discharge end. It is for this reason that a furnace chamber has been arranged along each side and under the lower half of the cylinder. By properly regulating the quantity of fuel oil delivered to the burners 13 practically any temperature may be maintained, particularly toward the rear end so that the oil and consequently the mass will be retained in a ready flowing condition.

The auxiliary transmission indicated at D is a very desirable feature as it permits operation of the mixer at a constant speed regardless of the tractor speed. The tractor is capable of traveling either at a high or low speed; approximately a quarter of a mile an hour being the low speed and half a mile per hour the high speed. When traveling at the lower speed the gathering blades 41 and 42 are set to gather material from a strip of maximum width. A substantially predetermined quantity of material will then pass through the mixing cylinder. The spray nozzles are regulated to give the proper mixture, etc. If the tractor speed is increased to the high speed or half mile an hour, the gathering blades must be adjusted to gather a strip of approximately half the width formerly handled. The quantity of material passing through the high speed will, however, be the same even though the strip gathered in is only half of that formerly handled, this being due to the fact that the machine is traveling at double the speed. Under the high speed condition the rotating speed of the mixer would tend to double as the tractor speed has doubled, but by using the two to one reduction obtained by the auxiliary transmission the rotating speed of the mixer will be reduced to half or to the identical speed maintained when the tractor was traveling at low speed. Hence, the conditions in the mixer will be constant regardless of tractor speed as the quantity of material passing through will be substantially the same, the revolutions of the mixer will be maintained constant, and the quantity of oil delivered by the spray nozzles will be constant, thereby avoiding continuously changing and adjusting during operation.

The material passed through the mixing cylinder is deposited at a uniform rate at the rear end of the machine and may here be engaged by a leveling blade, such as shown at 99, and it may then be rolled or otherwise compacted to form a finished road surface. All pipe connections whereby the oil or other binder employed is handled may be readily cleaned due to the connection between the fuel tank 70 and the pump and remaining piping system. The cover forming the upper half of the mixing cylinder may be quickly and readily removed at any time for inspection, cleaning, and repair by employing a stanchion such as indicated at 100, see Figs. 1 and 3, by hooking a chain block to the stanchion and swinging it over the cover, connection may be made with the handle of the cover and it may be elevated and then swung to one side. By thus removing the cover all parts are rendered accessible and adjustments or repairs may be quickly made.

Individual adjustment of the gathering blades 41 and 42 is a desirable feature. For instance, when treating the shoulders on the side of a paved highway, one of the gathering blades will be set in a position to run parallel with the edge of the pavement while the other blade will be angularly adjusted to reach out and gather in as wide a strip of shoulder as desired, and as either gathering blade may be adjusted independently of the other the machine is both right and left hand in operation; that is, it may be run along the shoulder of a highway on either side of the road and it may travel in either direction with relation to the road when operating.

I claim:

1. A road material mixing machine comprising a wheel supported main frame adapted to be connected to a tractor to be pulled over a road to be surfaced, a mixing cylinder carried by the frame, means for gathering up material from the road and for delivering it to the cylinder, a rotatable conveyor and mixer in the cylinder for mixing, conveying and discharging the material at the rear end of the cylinder, and means for transmitting power from the tractor to drive the mixer and conveyor.

2. A road material mixing machine comprising a wheel supported main frame adapted to be connected to a tractor to be pulled over a road to be surfaced, a mixing cylinder carried by the frame, means for gathering up material from the road and for delivering it to the cylinder, a rotatable conveyor and mixer in the cylinder for mixing, conveying and discharging the material at the rear end of the cylinder, a vertically adjustable frame mounted in the main frame and forming a support for the cylinder, together with the earth gathering mixing and conveying mechanism, a multiple speed transmission on the vertically adjustable frame and connected to drive the rotatable conveyor and mixer, and means for transmitting power from the tractor to drive the multiple speed transmission.

3. A road material mixing machine comprising a wheel supported main frame adapted to be connected to a tractor to be pulled over a road to be surfaced, a mixing cylinder carried by the frame, means for gathering up material from the road and for delivering it to the cylinder, a rotatable conveyor and mixer in the cylinder for mixing, conveying and discharging the material at the rear end of the cylinder, a vertically adjustable frame mounted in the main frame and forming a support for the cylinder, together with the earth gathering mixing and conveying mechanism, a multiple speed transmission on the vertically adjustable frame and connected to drive the rotatable conveyor and mixer, and a telescoping shaft universally connected at one end with the multispeed transmission and adapted to be universally connected to a power take-off shaft on the tractor to transmit power from the tractor to the multispeed transmission.

4. A road material mixing machine comprising a main frame mounted to travel over a road to be surfaced, a frame supported at each end by the main frame, means for variable vertical adjustment over a predetermined range of each end of said frame with relation to the main frame, a cylinder supported in the vertically adjustable frame, a conveying and mixing mechanism rotatably mounted in the cylinder, a scraper blade and a pair of gathering blades carried by the vertically adjustable frame and disposed in front of the cylinder, and a rotatable conveyor disposed in front of the cylinder vertically adjustable therewith and adapted to engage material piling up between the gathering blades and the scraper and for delivering said material into the front end of the cylinder.

5. A road material mixing machine comprising a main frame mounted to travel over a road to be surfaced, a frame supported by the main frame, means for vertically adjusting said frame with relation to the main frame, a cylinder supported in the vertically adjustable frame, a conveying and mixing mechanism rotatably mounted in the cylinder, means carried by the vertically adjustable frame for gathering and delivering road surfacing material to be treated to the front end of the cylinder, said vertically adjustable frame having means engageable with the road surface on each side of the cylinder to support said frame and the cylinder when in operation adapted and arranged to hold said cylinder against rotation when subjected to the turning torque of the conveying and mixing mechanism.

6. A road material mixing machine comprising a main frame mounted to travel over a road to be surfaced, a frame supported by the main frame, means for vertically adjusting said frame, with relation to the main frame, a cylinder supported in the vertically adjustable frame, a conveying and mixing mechanism rotatably mounted in the cylinder, means carried by the vertically adjustable frame for gathering and delivering road surfacing material to be treated to the front end of the cylinder, and a pair of runners one on each side of the vertically adjustable frame, said runners extending substantially from end to end of the frame and being engageable with the road surface to partially support said frame and the cylinder mounted therein and partially to resist rotational movement of the frame when subjected to the turning torque of the conveying and mixing mechanism.

7. A road material mixing machine comprising a main frame mounted for travel over a road to be surfaced, vertically adjustable supporting means disposed adjacent opposite ends of the main frame, a frame suspended from the vertically adjustable supporting means, radius rods connecting the suspended frame to the main frame to secure the suspended frame against longitudinal movement with relation to the main frame, a cylinder supported in the vertically adjustable frame, a conveying and mixing mechanism mounted in said cylinder, and means carried by the vertically adjustable frame for gathering and delivering road surfacing material to be treated to the cylinder.

8. A road material mixing machine comprising a main frame mounted for travel over a road to be surfaced, a pair of hydraulic jacks secured to the main frame adjacent the forward end, a second pair of hydraulic jacks secured to the main frame adjacent the rear end, cross beams connecting the respective pairs of hydraulic jacks, a frame suspended from said cross beams, radius rods connecting the suspended frame to the main frame to secure the suspended frame against longitudinal movement with relation to the main frame, means for actuating the hydraulic jacks to raise and lower the suspended frame with relation to the main frame and the road surface over which it travels, a cylinder supported in the suspended frame, conveying and mixing mechanism rotatably mounted in the cylinder, and means carried by the suspended frame for gathering and delivering road surfacing material to be treated to the cylinder.

9. In a machine of the character described an elongated open ended cylinder, a shaft extending through the cylinder and journaled at opposite ends thereof, a plurality of radially disposed arms secured at spaced intervals along the shaft, a helical shaped conveyor band secured to said arms and extending from end to end of the cylinder, mixing paddles secured on the outer ends of said arms, a scraper blade disposed in front of the cylinder, a pair of adjustable gathering blades disposed one at each end of the scraper blade, means disposed forward of the cylinder adapted to engage material piling up between the gathering blades and the scraper and for delivering the material to the front end of the cylinder, means for spraying hot oil on the surface of the material ahead of the scraper while the material is being gathered for delivery to the cylinder, and means for heating the cylinder to maintain the mix of material and oil in a ready flowing condition.

10. A dirt mixing machine comprising a wheel supported frame, an open ended cylinder supported in the frame, a scraper blade fixed to the cylinder to scrape material from a road surface during forward movement of the frame and to deliver such material into the cylinder, a material mixing and conveying unit in the cylinder, longitudinally extending radius rods pivotally connected to the cylinder and to the wheel supported frame at a point ahead of the cylinder, suspension members supporting opposite ends of the cylinder in the wheel supported frame, and means on the wheel supported frame for raising and lowering the suspension means and the cylinder supported thereby.

11. A road material mixing machine of the character described comprising an open ended cylinder adapted to receive material to be mixed in its front end, means to discharge oil onto said material, means in the cylinder to mix the oil and material and to discharge the mixture from the rear end of the cylinder, a furnace under the cylinder having chambers extending lengthwise of the lower portion of the cylinder and on opposite sides thereof, the cylinder forming one of the furnace chamber walls and burners mounted in the respective longitudinally extending chamber adjacent one end thereof, said chambers having outlet flues at the opposite end.

12. A road material mixing machine comprising the combination of a wheeled vehicle, an open ended cylinder mounted thereon and parallel therewith, a scraper for scooping up the material from the roadway into the cylinder as the machine progresses over the roadway, a screw conveyor within the cylinder and of greater length than the cylinder, with the forward end of the conveyor extending over the scraper and providing means to engage the scooped-up material and conveying it into the cylinder and mixing it therein, and means carried upon the vehicle for applying oil to the material to be treated before the material reaches the cylinder.

13. A road material mixing and delivering machine comprising in combination a main frame mounted to travel over a road to be surfaced, a cylinder carrying frame supported by the main frame, means for vertically adjusting said cylinder frame with relation to the main frame, a horizontally-disposed, open-ended, non-rotatable mixing cylinder supported in the vertically adjustable frame, a shaft with helically arranged blades rotatably mounted in the cylinder for conveying and mixing surfacing material, a scraper arranged adjacent to the front end of the cylinder and movable therewith as the machine travels over the road for gathering and delivering road surfacing material to be treated to the front end of the cylinder, said conveyor shaft and blades having an extension beyond the front end of the cylinder and extending over and in proximity to the scraper to engage with, and initially act upon, the scooped up material on the scraper and to assist in feeding said material into the cylinder as the machine progresses, means to mix oil with the material on the scraper, and means to heat the material as it goes through the machine.

14. A road material mixing and delivering machine comprising, in combination, a main frame mounted to travel over a road to be surfaced, a cylinder carrying frame supported at each end by the main frame, means for vertically adjusting each end of said cylinder frame with relation to the main frame, a horizontally-disposed, open-ended, non-rotatable mixing cylinder supported in the vertically adjustable frame, a shaft with helically arranged blades rotatably mounted in the cylinder for conveying and mixing surfacing material, a scraper arranged adjacent to the front end of the cylinder and movable therewith as the machine travels over the road for gathering and delivering road surfacing material to be treated to the front end of the cylinder, said conveyor shaft and blades having an extension beyond the front end of the cylinder and extending over and in proximity to the scraper to engage with, and initially act upon, the scooped up material on the scraper and to assist in feeding said material into the cylinder as the machine progresses, and means for applying an oil binder to the material adjacent to the point of entry of the material into the mixing cylinder.

15. A road material mixing and delivering machine comprising, in combination, a main frame mounted to travel over a road to be surfaced, a vertically adjustable frame supported at each end by the main frame, means for variable vertical adjustment over a predetermined range of each end of said frame with relation to the main frame, a horizontally-disposed, open-ended, non-rotatable cylinder supported in the vertically adjustable frame, a conveying and mixing mechanism rotatably mounted in the cylinder, a scraper carried on and extending forward of the cylinder, a pair of gathering blades carried by the vertically adjustable frame and disposed in front of the cylinder, and a supplemental conveying means in front of the cylinder and vertically adjustable therewith adapted to engage material piling up on the scraper and between the gathering blades for delivering said piled up material into the front end of the cylinder to be there acted upon by the conveying and mixing means in the cylinder.

16. A road material mixing and surfacing machine comprising, in combination, a vehicle mounted to travel over the road to be surfaced, a horizontally-disposed, open-ended, non-rotatable cylinder mounted on the vehicle, with its axis in the line of travel of the vehicle, means for independently raising and lowering each end of the cylinder bodily to and from the road surface to be treated, a scraper on the advance end of the cylinder to scoop up the material to be treated, means to apply an oil binder to the material adjacent to the front end of the cylinder, a screw conveyor within and extending lengthwise of the cylinder and having its forward end projecting beyond the front end of the cylinder and over the scraper and adapted to engage the scooped-up material thereon before the latter enters the cylinder, and means for operating the conveyor to cause the scooped-up material to be passed through the cylinder and discharged at the open rear end of the latter.

17. In a road material mixing and surfacing machine, the combination of a wheeled vehicle adapted to travel over the road to be surfaced, an open-ended, horizontally-disposed, non-rotatable mixing cylinder on the vehicle and in substantially parallelism with, and disposed adjacent to, the surface to be treated, supporting runners on the cylinder, means for independently raising and lowering the opposite ends of the runners and cylinder, a scraper carried by, and movable with, the vehicle for scooping up the material from the roadway preparatory to its delivery into the cylinder as the machine progresses over the roadway, a screw conveyor within the cylinder with its forward end projecting beyond the front end of the conveyor and extending over the scraper to engage the scooped-up material, said screw conveyor and its forward extension providing means for delivering the material to be treated into and then through the cylinder and discharging it from the rear thereof as the vehicle progresses, and means located adjacent to the forward end of the cylinder for treating the material with a binder.

18. A road material mixing and surfacing machine comprising, in combination, a main frame mounted to travel over the road to be surfaced, a vertically adjustable frame mounted on the main frame with means for effecting such adjustment, a horizontally-disposed, elongated, open-ended, non-rotatable cylinder mounted on, and movable with, the adjustable frame and normally arranged to be positioned in close proximity to the roadbed under treatment and approximately level with the road surface, with means to raise and lower the rear end of the cylinder, the latter having a forwardly extending scraper section to scoop up the material and to feed positively the scooped-up material on the scraper into the front end of the cylinder, and a screw propeller within and extending substantially the length of the cylinder to pick up the material delivered from the scraper and to convey and mix it in transit through the cylinder and discharge it at the rear end of the cylinder upon the roadbed.

19. A road material mixing and surfacing machine comprising, in combination, a main frame mounted to travel over the road to be surfaced, a vertically adjustable frame mounted on the main frame with means for effecting such adjustment, a horizontally-disposed, elongated, open-ended, non-rotatable cylinder mounted on, and movable with, the adjustable frame and normally arranged to be positioned in close proximity to the roadbed under treatment and approximately level with the road surface, with means to raise and lower the rear end of the cylinder, the latter having a forwardly extending scraper section to scoop up the material and to feed positively the scooped-up material on the scraper into the front end of the cylinder, a screw propeller within and extending substantially the length of the cylinder to pick up the material delivered from the scraper and to convey and mix it in transit through the cylinder and discharge it at the rear end of the cylinder upon the roadbed, and means to regulate the rotational speed of said screw propeller in accordance with the speed of travel of the machine whereby substantially constant speed of agitation is maintained.

20. A road material mixing and surfacing machine comprising, in combination, a vehicle mounted to travel over a roadway to be surfaced, a horizontally-disposed, open-ended, non-rotatable, mixing cylinder mounted on the vehicle with means for independently effecting the bodily adjustment vertically of each end of the cylinder with respect to the surface to be treated, means to apply heat to the cylinder during the travel of the machine, a screw conveyor mechanism within and extending lengthwise of the cylinder, whereby material introduced into the forward end of the cylinder is conveyed and mixed during its movement through the cylinder and thence discharged at the rear, a scraper at the forward end of the cylinder to gather the surfacing material from the roadbed, an extension of the screw conveyor over the scraper and engageable with the material on the scraper to advance it into the cylinder, and means for applying oil to the material undergoing mixing operation.

21. A road material mixing and surfacing machine comprising, in combination, a vehicle mounted to travel over a roadway to be surfaced, a horizontally-disposed, open-ended, non-rotatable, mixing cylinder mounted on the vehicle, with means for independently effecting the bodily adjustment vertically of each end of the cylinder with respect to the surface to be treated, means to apply heat to the cylinder during the travel of the machine, a screw conveyor mechanism within and extending lengthwise of the cylinder, whereby material introduced into the forward end of the cylinder is conveyed and mixed during its movement through the cylinder and thence discharged at the rear, a scraper at the forward end of the cylinder to gather the surfacing material from the roadbed, an extension of the screw conveyor over the scraper and engageable with the material on the scraper to advance it into the cylinder, means for applying oil to the material undergoing mixing operation, and means for maintaining the rotation of the screw conveyor at substantially constant speed regardless of the rate of travel of the vehicle.

CLYDE W. WOOD.